United States Patent
Chakraborty et al.

(10) Patent No.: US 9,428,383 B2
(45) Date of Patent: Aug. 30, 2016

(54) AMPHIPHILIC NANOPARTICLE, COMPOSITION COMPRISING SAME AND METHOD OF CONTROLLING OIL SPILL USING AMPHIPHILIC NANOPARTICLE

(75) Inventors: Soma Chakraborty, Houston, TX (US); Gaurav Agrawal, Aurora, CO (US)

(73) Assignee: BAKER HUGHES INCORPORATED, Houston, TX (US)

( * ) Notice: Subject to any disclaimer, the term of this patent is extended or adjusted under 35 U.S.C. 154(b) by 857 days.

(21) Appl. No.: 13/213,827

(22) Filed: Aug. 19, 2011

(65) Prior Publication Data

US 2013/0045897 A1 Feb. 21, 2013

(51) Int. Cl.
| C09K 8/035 | (2006.01) |
| C07C 53/00 | (2006.01) |
| C07D 309/00 | (2006.01) |
| C07C 211/00 | (2006.01) |
| C09K 8/03 | (2006.01) |
| C07C 31/02 | (2006.01) |
| C01B 13/14 | (2006.01) |
| C08G 77/38 | (2006.01) |
| C07C 43/10 | (2006.01) |
| B82Y 30/00 | (2011.01) |
| C09K 8/524 | (2006.01) |
| C09K 8/92 | (2006.01) |

(52) U.S. Cl.
CPC .............. B82Y 30/00 (2013.01); C09K 8/524 (2013.01); C09K 8/92 (2013.01); C09K 2208/10 (2013.01); Y10T 428/2982 (2015.01)

(58) Field of Classification Search
CPC ...... C09K 8/035; C07C 53/00; C07D 309/00
See application file for complete search history.

(56) References Cited

U.S. PATENT DOCUMENTS

| 3,404,061 | A | 10/1968 | Shane et al. |
| 4,774,990 | A | 10/1988 | Yamamoto et al. |
| 5,279,873 | A | 1/1994 | Oike |
| 6,882,094 | B2 | 4/2005 | Dimitrijevic et al. |
| 7,048,048 | B2 | 5/2006 | Nguyen et al. |
| 7,112,361 | B2 | 9/2006 | Lynn et al. |
| 7,745,528 | B2 | 6/2010 | Prud'Homme et al. |
| 7,758,841 | B2 | 7/2010 | Billups et al. |
| 8,876,944 | B2 | 11/2014 | Ren et al. |
| 9,115,580 | B2 | 8/2015 | Mazyar et al. |
| 2004/0013597 | A1 | 1/2004 | Mao et al. |
| 2004/0018364 | A1 | 1/2004 | Ota et al. |
| 2004/0053037 | A1 | 3/2004 | Koch et al. |
| 2004/0229983 | A1 | 11/2004 | Winowiecki |
| 2005/0001317 | A1 | 1/2005 | Ganapathiraman et al. |
| 2005/0070655 | A1 | 3/2005 | Van Den Bergen et al. |
| 2005/0161212 | A1 | 7/2005 | Leismer et al. |
| 2006/0199770 | A1 | 9/2006 | Bianco et al. |
| 2007/0003471 | A1 | 1/2007 | Kawabata |
| 2007/0107908 | A1 | 5/2007 | Vaidya et al. |
| 2007/0142547 | A1 | 6/2007 | Vaidya et al. |
| 2007/0237546 | A1 | 10/2007 | Zona et al. |
| 2007/0284557 | A1 | 12/2007 | Gruner et al. |
| 2008/0087431 | A1 | 4/2008 | Willauer et al. |
| 2008/0127475 | A1 | 6/2008 | Griffo |
| 2008/0149363 | A1 | 6/2008 | Han et al. |
| 2008/0220282 | A1 | 9/2008 | Jang et al. |
| 2008/0306225 | A1* | 12/2008 | Prud'Homme et al. ........ 526/89 |
| 2009/0036605 | A1* | 2/2009 | Ver Meer ........................ 525/55 |
| 2009/0155578 | A1 | 6/2009 | Zhamu et al. |
| 2009/0198009 | A1 | 8/2009 | Matsuki et al. |
| 2009/0308520 | A1 | 12/2009 | Shin et al. |
| 2010/0021708 | A1 | 1/2010 | Kong et al. |
| 2010/0047154 | A1 | 2/2010 | Lee et al. |
| 2010/0059726 | A1 | 3/2010 | Jung et al. |
| 2010/0096595 | A1 | 4/2010 | Prud'Homme et al. |
| 2010/0130701 | A1 | 5/2010 | Lahdensuo |
| 2010/0159366 | A1 | 6/2010 | Shao-Horn et al. |
| 2010/0163844 | A1 | 7/2010 | Ermolov |
| 2010/0178464 | A1 | 7/2010 | Choi et al. |
| 2010/0179645 | A1 | 7/2010 | Chen et al. |
| 2010/0314118 | A1 | 12/2010 | Quintero et al. |
| 2011/0067872 | A1 | 3/2011 | Agrawal |
| 2011/0200674 | A1 | 8/2011 | MacKay |
| 2011/0232901 | A1 | 9/2011 | Carrejo et al. |

FOREIGN PATENT DOCUMENTS

| KR | 10-2004-0095581 A | 11/2004 |
| KR | 10-0620615 B1 | 9/2006 |
| KR | 10-2007-0053164 A | 5/2007 |
| KR | 10-2009-0014186 A | 2/2009 |
| KR | 10-2009-0086536 A | 8/2009 |
| KR | 1020110053012 A | 5/2011 |
| WO | 03/103854 A1 | 12/2003 |

(Continued)

OTHER PUBLICATIONS

Dyke et al., Covalent Functionalization of Single-Walled Carbon Nanotubes for Materials Application, American Chemical Society, Sep. 2004, p. 11151-11159.*
Chattopadhyay et al., Carbon Nanotube Salts. Arylation of Single-Wall Carbon Nanotubes, Rice Univ., Apr. 2005, p. 4067-4069.*
Aravind Dasari et al., "Fundamental aspects and recent progress on wear/scratch damage in polymer nanocomposites," Materials Science and Engineering R 63 (2009) 31-80.
Christopher A. Dyke et al., "Covalent Functionalization of Single-Walled Carbon Nanotubes for Materials Applications," The Journal of Physical Chemistry; vol. 108, No. 51, Dec. 23, 2004, pp. 11151-11159.

(Continued)

Primary Examiner — Jeffrey Washville
(74) Attorney, Agent, or Firm — Cantor Colburn LLP

(57) ABSTRACT

An amphiphilic nanoparticle comprises a nanoparticle having a hydrophilic region comprising a hydrophilic functional group bonded to a first portion of a surface of the nanoparticle, and a hydrophobic region of a surface of the nanoparticle. A downhole fluid comprises the amphiphilic nanoparticle, and a method of controlling an oil spill using the downhole fluid are also disclosed.

21 Claims, No Drawings

(56) References Cited

FOREIGN PATENT DOCUMENTS

| WO | 2007098578 A1 | 9/2007 |
|----|---------------|--------|
| WO | 2008/048705 A2 | 4/2008 |
| WO | 2008045778 A1 | 4/2008 |
| WO | 2008097343 A2 | 8/2008 |
| WO | 2008130431 A2 | 10/2008 |
| WO | 2010002770 A1 | 1/2010 |
| WO | 2010147860 A1 | 12/2010 |

OTHER PUBLICATIONS

Jinni Deng et al., "Mechanical and Surface Properties of Polyurethane/Fluorinated Multi-Walled Carbon Nanotubes Composites," Journal of Applied Polymer Science DOI 10.1002/app.27625, Published online Feb. 4, 2008 in Wiley InterScience (www.interscience.wiley.com), pp. 2023-2028.

International Search Report and Written Opinion for International Application No. PCT/US2011/043033; Mailed Mar. 22, 2012; 11 pages.

International Search Report and Written Opinion for International Application No. PCT/US2011/050956; Mailed Apr. 30, 2012; 10 pages.

Thierry Cassagneau et al., "Preparation and Characterization of Ultrathin Films Layer-by-Layer Self-Assembled from Graphite Oxide Nanoplatelets and Polymers"; Langmuir 2000 16 (18), 7318-7324.

Borondics et al., "Functionalization of Carbon Nanotubes Via Dissolving Metal Reductdions," Journal of Nanoscience and Nanotechnology; 7; pp. 1551-1559; (2007).

Busick et al., "Effects of graphite content on the morphology and barrier properties of poly(vinylidene fluoride) composites," Polymer 40: pp. 6023-6029 (1999).

Chakraborty et al., "Reductive Alkylation of Fluorinated Graphite"; Chem. Mater.; 20; pp. 3134-3136; (2008).

Chattopadhyay et al., "Carbon Nanotube Salts. Arylation of Single-Wall Carbon Nanotubes"; Organic Letters; 7 (19); pp. 4067-4069; (2005).

Deanna N. Busick et al., "Effects of graphite content on the morphology and barrier properties of poly(vinylidene fluoride) composites," Polymer 40; 1999; pp. 6023-6029.

Hannes C. Schniepp et al., "Functionalized Single Graphene Sheets Derived from Splitting Graphite Oxide," The Journal of Physical Chemistry Letters, vol. 110; 2006; pp. 8535-8539.

Lee et al., "Layer-by-Layer Assembly of All Carbon Nanotube Ultrathin Films for Electrochemical Applications," J. Am. Chem. Soc., 131 (2); pp. 671-679; (2009).

Liang et al., "A Convenient Route to Functionalized Carbon Nanotubes"; Nano Letters; 4(7); pp. 1257-1260; (2004).

Nina I. Kovtyukhova et al., Layer-by-Layer Assembly of Ultrathin Composite Films from Micron-Sized Graphite Oxide Sheets and Polycations; Chem. Mater, vol. 11, No. 3; 1999; pp. 771-778.

Sasha Stankovich et al., "Graphene-based composite materials", Nature 04969, vol. 442; 2006; pp. 282-286.

Shen et al., "Layer-by-Layer Self-Assembly of Graphene Nanoplatelets", Langmuir; 25(11), pp. 61-22-6128; (2009).

Stephenson et al., "Highly Functionalized and Soluble Multiwalled Carbon Nanotubes by Reductive Alkylation and Arylation: The Billups Reaction", Chem. Mater. 18, pp. 4658-4661; (2006).

Williams S. Hummers Jr. et al., "Preparation of Graphitic Oxide," J. Am. Chem. Soc.; 1957; pp. 1339.

Woo-Sik Jang et al., "Layer-by-layer assembly of thin film oxygen barrier," Thin Solid Films, vol. 516; 2008; pp. 4819-4825.

Mitchell et al. "Dispersion of Functionalized Carbon Nanotubes in Polystyrene", Macromolecules 2002, 35, 8825-8830.

Extended European Search Report for related EP Application No. 11745232.6-1303 / 2536561, dated Feb. 6, 2014, pp. 1-8.

International Search Report and Written Opinion; International Application No. PCT/US2012/0024094; International Filing Date: Feb. 7, 2012; Date of Mailing: Sep. 3, 2012; 7 pages.

International Search Report and Written Opinion; International Application No. PCT/US2012/069098; International Filing Date: Dec. 12, 2012; Date of Mailing: Mar. 15, 2013; 12 pages.

Office Action for related Gulf Co-Operation Application No. GC 2011-17807, dated Sep. 21, 2014, pp. 1-18.

Pekker, et al. Hydrogenation of Carbon Nanotubes and Graphite in Liquid Ammonia, J. Phys. Chem. B. 2001; 105: 7938-7943.

Scientific Background on the Nobel Prize in Physics 2010—Graphene—compiled by the Class for Physics of the Royal Swedish Academy of Sciences, The Royal Swedish Academy of Sciences, pp. 1-10 (Oct. 5, 2010).

Singh, et al. Organic functionalization and characterization of single-walled carbon nanotubes, Chemical Society Reviews 2009; 38: 2214-2230.

Sirotinkin, et al., "Model of Formation of Three-Dimensional Polyurethane Films Modified by Detonation Nanodiamonds," Physics of the Solid State, vol. 46, 2004, pp. 746-747. Translated from Fizika Tverdogo Tela, vol. 46, 2004, pp. 725-726.

Office Action for related Canadian Application No. 2,841,836, dated Feb. 19, 2015, pp. 1-5.

Office Action for related Chinese Application No. 201280036465.1, dated Apr. 3, 2015, pp. 1-22.

Viory et al., "Dissolution and alkylation of industrially produced multiwalled carbon nanotubes", Carbon, 49, 1, pp. 170-175, Jan. 1, 2011.

Liu et al., "Graphene-Based Supercapacitor with an Ultrahigh Energy Density", Nano. Lett. 2010, 10, pp. 4863-4868.

* cited by examiner

US 9,428,383 B2

AMPHIPHILIC NANOPARTICLE, COMPOSITION COMPRISING SAME AND METHOD OF CONTROLLING OIL SPILL USING AMPHIPHILIC NANOPARTICLE

BACKGROUND

Remediation and dispersal of unplanned oil ejection from, for example, an oil well, can include breaking up the spill by application of a surfactant. Typical surfactants include those based on fatty acids and sulfonate-containing compounds. However, such surfactants may have a limited effectiveness in sequestering oil, and large amounts are required.

Nanoparticles have been found to have desirable physical properties, including high surface area. With the increase in availability and decreasing cost of nanoparticles, which are becoming available in relative quantity compared to several years ago, there is greater interest in tailoring the properties of nanoparticles to further suit the needs of diverse applications.

SUMMARY

The above and other deficiencies in the prior art can be overcome by, in an embodiment, an amphiphilic nanoparticle, comprising a nanoparticle having a hydrophilic region comprising a hydrophilic functional group bonded to a first portion of a surface of the nanoparticle, and a hydrophobic region of a surface of the nanoparticle.

In another embodiment, a downhole fluid comprises an amphiphilic nanoparticle, comprising a hydrophilic region comprising a hydrophilic functional group bonded to a first portion of a surface of the nanoparticle, and a hydrophobic region of a surface of the nanoparticle; and a fluid medium.

In another embodiment, a method of controlling an oil spill comprises adding downhole fluid comprising an amphiphilic nanoparticle, comprising a hydrophilic region comprising a hydrophilic functional group bonded to a first portion of a surface of the nanoparticle, and a hydrophobic region of a surface of the nanoparticle; and a fluid medium, to an oil well.

DETAILED DESCRIPTION

Disclosed herein is a novel amphiphilic nanoparticle having a hydrophilic signature in one region, and a hydrophobic signature in another region. The disposition of these regions allows the amphiphilic nanoparticle, when added to an environment containing water and a hydrocarbon, to align its hydrophilic portion toward the water environment and the hydrophobic core toward the hydrocarbon environment. In this way, the amphiphilic nanoparticles, in the presence of an oil/water environment, isolate the oil rich zones into individual pockets and thereby form an emulsion. Because of the large surface area (greater than 180 $m^2/g$) of the amphiphilic nanoparticles, a very small amount of amphiphilic nanomaterial of e.g., less than or equal to 2-3 grams, can in principle be sufficient to disperse an oil spill covering a large area (e.g., approximately 5,000 $m^2$), which is a significant improvement over conventional oil-dispersant systems.

In addition, the amphiphilic nanoparticles can be used in novel ways in stimulation fluids to retard unplanned oil spills. For example, when a stimulation fluid is introduced to a well that is undergoing an unplanned oil ejection, the amphiphilic nanoparticles mix with the hydrocarbon environment, reducing the viscosity of the resultant fluid because of the high shear thinning properties of the amphiphilic nanoparticle. When such a system is ejected to the surface, the nanoparticles quickly come in contact with the oil-water interface and can emulsify the oil into isolated pockets, retarding the oil spill and facilitating any remediation processes often required in oil spills.

The amphiphilic nanoparticle thus includes a nanoparticle having a hydrophilic region comprising a hydrophilic functional group bonded to a first portion of a surface of the nanoparticle, and a hydrophobic region of a surface of the nanoparticle.

Nanoparticles, from which the amphiphilic nanoparticles are formed, are generally particles having an average particle size, in at least one dimension, of less than one micrometer (μm). As used herein "average particle size" refers to the number average particle size based on the largest linear dimension of the particle (sometimes referred to as "diameter"). Particle size, including average, maximum, and minimum particle sizes, can be determined by an appropriate method of sizing particles such as, for example, static or dynamic light scattering (SLS or DLS) using a laser light source. Nanoparticles include both particles having an average particle size of 250 nm or less, and particles having an average particle size of greater than 250 nm to less than 1 μm (sometimes referred in the art as "sub-micron sized" particles). In an embodiment, a nanoparticle has an average particle size of about 0.01 to about 500 nanometers (nm), in another embodiment, 0.05 to 250 nm, in another embodiment, about 0.1 to about 150 nm, and in another embodiment about 1 to about 75 nm. The nanoparticles are monodisperse, where all particles are of the same size with little variation, or polydisperse, where the particles have a range of sizes and are averaged. Generally, polydisperse nanoparticles are used. In another embodiment, nanoparticles of different average particle sizes are used, and in this way, the particle size distribution of the nanoparticles is unimodal (exhibiting a single distribution), bimodal exhibiting two distributions, or multi-modal, exhibiting more than one particle size distribution.

The minimum particle size for the smallest 5 percent of the nanoparticles is less than 0.05 nm, in an embodiment less than or equal to 0.02 nm, and in another embodiment less than or equal to 0.01 nm. Similarly, the maximum particle size for 95% of the nanoparticles is greater than or equal to 900 nm, in an embodiment greater than or equal to 750 nm, and in another embodiment greater than or equal to 500 nm.

The nanoparticles have a high surface area of greater than 180 $m^2/g$, in an embodiment, 300 $m^2/g$ to 1800 $m^2/g$, and in another embodiment 500 $m^2/g$ to 1500 $m^2/g$.

The nanoparticles used to form the amphiphilic nanoparticle include fullerenes, nanotubes, nanographite, graphene including nanographene and graphene fiber, nanodiamonds, polysilsesquioxanes, inorganic nanoparticles including silica nanoparticles, nanoclays, metal particles, or combinations comprising at least one of the foregoing.

Fullerenes, as disclosed herein, include any of the known cage-like hollow allotropic forms of carbon possessing a polyhedral structure. Fullerenes include, for example, those having from about 20 to about 100 carbon atoms. For example, $C_{60}$ is a fullerene having 60 carbon atoms and high symmetry ($D_{5h}$), and is a relatively common, commercially available fullerene. Exemplary fullerenes include $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like.

Nanotubes include carbon nanotubes, inorganic nanotubes (e.g., boron nitride nanotubes), metallated nanotubes, or a combination comprising at least one of the foregoing.

Nanotubes are tubular fullerene structures having open or closed ends and which are inorganic (e.g., boron nitride) or made entirely or partially of carbon. In an embodiment, carbon and inorganic nanotubes include additional components such as metals or metalloids, which are incorporated into the structure of the nanotube, included as a dopant, form a surface coating, or a combination comprising at least one of the foregoing. Nanotubes, including carbon and inorganic nanotubes, are single walled nanotubes (SWNTs) or multi-walled nanotubes (MWNTs).

Nanographite is a cluster of plate-like sheets of graphite, in which a stacked structure of one or more layers of graphite, which has a plate-like two-dimensional structure of fused hexagonal rings with an extended delocalized π-electron system, are layered and weakly bonded to one another through π-π stacking interaction. Nanographite has both micro- and nano-scale dimensions, such as for example an average particle size of 1 to 20 μm, in an embodiment 1 to 15 μm, and an average thickness (smallest) dimension in nano-scale dimensions, and an average thickness of less than 1 μm, in an embodiment less than or equal to 700 nm, and in another embodiment less than or equal to 500 nm.

In an embodiment, the nanoparticle is graphene including nanographene and graphene fibers (i.e., graphene particles having an average largest dimension of greater than 1 μm, a second dimension of less than 1 μm, and an aspect ratio of greater than 10, where the graphene particles form an interbonded chain). Graphene and nanographene, as disclosed herein, are effectively two-dimensional particles of nominal thickness, having of one, or more than one layers of fused hexagonal rings with an extended delocalized π-electron system; as with nanographite, where more than one graphene layer is present, the layers are weakly bonded to one another through π-π stacking interaction. Graphene in general, and including nanographene (with an average particle size of less than 1 μm), is thus a single sheet or a stack of several sheets having both micro- and nano-scale dimensions. In some embodiments, graphene has an average particle size of 1 to 20 μm, in another embodiment 1 to 15 μm, and an average thickness (smallest) dimension in nano-scale dimensions of less than or equal to 50 nm, in an embodiment less than or equal to 25 nm, and in another embodiment less than or equal to 10 nm. An exemplary graphene has an average particle size of 1 to 5 μm, and in an embodiment 2 to 4 μm. In another embodiment, smaller nanoparticles or sub-micron sized particles as defined above are combined with nanoparticles having an average particle size of greater than or equal to 1 μm. In a specific embodiment, the amphiphilic nanoparticle is a derivatized graphene.

Graphene, including nanographene, is prepared by, for example, exfoliation of nanographite or by a synthetic procedure by "unzipping" a nanotube to form a nanographene ribbon, followed by derivatization of the nanographene to prepare nanographene oxide.

Exfoliation to form graphene or nanographene is carried out by exfoliation of a graphite source such as graphite, intercalated graphite, and nanographite. Exemplary exfoliation methods include, but are not limited to, those practiced in the art such as fluorination, acid intercalation, acid intercalation followed by high temperature treatment, and the like, or a combination comprising at least one of the foregoing. Exfoliation of the nanographite provides a nanographene having fewer layers than non-exfoliated nanographite. It will be appreciated that exfoliation of nanographite may provide the nanographene as a single sheet only one molecule thick, or as a layered stack of relatively few sheets. In an embodiment, exfoliated nanographene has fewer than 50 single sheet layers, in an embodiment fewer than 20 single sheet layers, in another embodiment fewer than 10 single sheet layers, and in another embodiment fewer than 5 single sheet layers.

A nanodiamond is a diamond particle having an average particle size of less than one micrometer (μm). Nanodiamonds are from a naturally occurring source, such as a by-product of milling or other processing of natural diamonds, or are synthetic, prepared by any suitable commercial method. Nanodiamonds are used as received, or are sorted and cleaned by various methods to remove contaminants and non-diamond carbon phases present, such as residues of amorphous carbon or graphite.

Polysilsesquioxanes, also referred to as polyorganosilsesquioxanes or polyhedral oligomeric silsesquioxanes (POSS) derivatives are polyorganosilicon oxide compounds of general formula $RSiO_{1.5}$ (where R is an organic group such as methyl) having defined closed or open cage structures (closo or nido structures). Polysilsesquioxanes, including POSS structures, may be prepared by acid and/or base-catalyzed condensation of functionalized silicon-containing monomers such as tetraalkoxysilanes including tetramethoxysilane and tetraethoxysilane, alkyltrialkoxysilanes such as methyltrimethoxysilane and methyltrimethoxysilane.

Nanoclays are hydrated or anhydrous silicate minerals with a layered structure and include, for example, aluminosilicate clays such as kaolins including halloysite, smectites including montmorillonite, illite, and the like. Exemplary nanoclays include those marketed under the tradename CLOISITE® marketed by Southern Clay Additives, Inc. Nanoclays are exfoliated to separate individual sheets, or are non-exfoliated, and further, are dehydrated or included as hydrated minerals. Other nano-sized mineral fillers of similar structure are also included such as, for example, talc, micas including muscovite, phlogopite, or phengite, or the like.

Inorganic nanoparticles include a metal or metalloid oxide such as silica, alumina, titania, tungsten oxide, iron oxides, combinations thereof, or the like; a metal or metalloid carbide such as tungsten carbide, silicon carbide, boron carbide, or the like; a metal or metalloid nitride such as titanium nitride, boron nitride, silicon nitride, or the like; or a combination comprising at least one of the foregoing.

Metal nanoparticles include those made from metals such as iron, tin, titanium, platinum, palladium, cobalt, nickel, vanadium, alloys thereof, or a combination comprising at least one of the foregoing. In other embodiments, inorganic nanoparticles include those coated with one or more layers of metals such as iron, tin, titanium, platinum, palladium, cobalt, nickel, vanadium, alloys thereof, or a combination comprising at least one of the foregoing.

Nanoparticles in general can be derivatized to include a variety of different functional groups such as, for example, carboxy (e.g., carboxylic acid groups), epoxy, ether, ketone, amine, hydroxy, alkoxy, alkyl, aryl, aralkyl, alkaryl, lactone, functionalized polymeric or oligomeric groups, and the like. In an embodiment, the nanoparticle is functionalized to include a hydrophilic functional group including hydroxy, carboxylic acid, amine, lactone, polyethylene glycol, a hydrophilic polymer, ionic groups such as ammonium groups and/or carboxylate salt groups, or a combination comprising at least one of the foregoing. In addition, the amphiphilic nanoparticle includes a hydrophobic region that is unfunctionalized, or includes a functional group comprises alkyl, alkoxy, aryl, aryloxy, aralkyl, aralkyloxy, functionalized polymeric or oligomeric groups, or a combination of these groups. In another embodiment, the nanoparticles include a combination of derivatized (amphiphilic) nanoparticles and underivatized nanoparticles.

In an embodiment, the amphiphilic nanoparticle includes graphene or a nanotube functionalized on an edge (or an end in the case of a nanotube) with a hydrophilic group. The surface of the graphene/nanotube is hydrophobic, while the edge functionalized in this way is hydrophilic, and hence the net functionalized graphene/nanotube is amphiphilic, having a high surface area.

Alternatively, the surface of the graphene sheet is derivatized to include hydrophilic groups to increase dispersibility in and interaction with an aqueous phase. In an embodiment, the derivatized nanoparticle is further modified to include additional hydrophilic, hydrophobic, oxophilic, lipophilic, or oleophilic groups to provide a balance of desirable properties.

In an exemplary embodiment, the nanoparticle is derivatized by, for example, amination to include amine groups, where amination may be accomplished by nitration followed by reduction, or by nucleophilic substitution of a leaving group by an amine, substituted amine, or protected amine, followed by deprotection as necessary. In another embodiment, the nanoparticle is derivatized by oxidative methods to produce an epoxy, hydroxy group or glycol group using a peroxide, or by cleavage of a double bond by for example a metal mediated oxidation such as a permanganate oxidation to form ketone, aldehyde, or carboxylic acid functional groups. In another embodiment, the nanoparticle is metallated to form an anionic species that is quenched using an anion reactive agent (e.g., an alkyl halide, carbon dioxide, an epoxy group, etc.)

Where the functional groups are alkyl, aryl, aralkyl, alkaryl, functionalized polymeric or oligomeric groups, or a combination of these groups, the functional groups are attached through intermediate functional groups (hydroxy, carboxy, amino) or directly to the derivatized nanoparticle by: a carbon-carbon bond without intervening heteroatoms, to provide greater thermal and/or chemical stability to the derivatized nanoparticle, as well as a more efficient synthetic process requiring fewer steps; by a carbon-oxygen bond (where the nanoparticle contains an oxygen-containing functional group such as hydroxy or carboxylic acid); or by a carbon-nitrogen bond (where the nanoparticle contains a nitrogen-containing functional group such as amine or amide). In an embodiment, the nanoparticle can be derivatized by metal mediated reaction with a $C_{6-30}$ aryl or $C_{7-30}$ aralkyl halide (F, Cl, Br, I) in a carbon-carbon bond forming step, such as by a palladium-mediated reaction such as the Stille reaction, Suzuki coupling, or diazo coupling, or by an organocopper coupling reaction.

In another embodiment, a nanoparticle, such as a fullerene, nanotube, nanodiamond, or nanographene, is directly metallated by reaction with e.g., an alkali metal such as lithium, sodium, or potassium, followed by reaction with a $C_{1-30}$ alkyl or $C_{7-30}$ alkaryl compound with a leaving group such as a halide (Cl, Br, I) or other leaving group (e.g., tosylate, mesylate, etc.) in a carbon-carbon bond forming step. The aryl or aralkyl halide, or the alkyl or alkaryl compound, may be substituted with a functional group such as hydroxy, carboxy, ether, or the like. Exemplary groups include, for example, hydroxy groups, carboxylic acid groups, alkyl groups such as methyl, ethyl, propyl, butyl, pentyl, hexyl, octyl, dodecyl, octadecyl, and the like; aryl groups including phenyl and hydroxyphenyl; aralkyl groups such as benzyl groups attached via the aryl portion, such as in a 4-methylphenyl, 4-hydroxymethylphenyl, or 4-(2-hydroxyethyl)phenyl (also referred to as a phenethylalcohol) group, or the like, or aralkyl groups attached at the benzylic (alkyl) position such as found in a phenylmethyl or 4-hydroxyphenyl methyl group, at the 2-position in a phenethyl or 4-hydroxyphenethyl group, or the like. In an exemplary embodiment, the derivatized nanoparticle is nanographene substituted with a benzyl, 4-hydroxybenzyl, phenethyl, 4-hydroxyphenethyl, 4-hydroxymethylphenyl, or 4-(2-hydroxyethyl)phenyl group or a combination comprising at least one of the foregoing groups.

In another embodiment, the nanoparticle is further derivatized by grafting certain polymer chains to the functional groups. For example, polymer chains such as acrylic chains having carboxylic acid functional groups, hydroxy functional groups, and/or amine functional groups; polyamines such as polyethyleneamine or polyethyleneimine; and poly(alkylene glycols) such as poly(ethylene glycol) and polypropylene glycol), may be included by reaction with functional groups.

Where the nanoparticle is a carbon-based nanoparticle such as nanographene, a carbon nanotube, nanodiamond, or the like, the degree of functionalization varies from 1 functional group for every 5 carbon centers to 1 functional group for every 100 carbon centers, depending on the functional group, and the method of functionalization.

It will be appreciated that in certain embodiments, for example where there is a lack of selectivity for placing hydrophilic groups and hydrophobic groups in different regions of the same nanoparticle, two different nanoparticles, or a nanoparticle and a microparticle, each having a different functionality or signature (hydrophilic or hydrophobic) are linked to form the amphiphilic nanoparticle as a composite of the two nanoparticles (or nano and microparticles. In an embodiment, the amphiphilic nanoparticle is a composite amphiphilic nanoparticle comprising a first nanoparticle and/or microparticle having a hydrophilic group, and a second nanoparticle and/or microparticle having a hydrophobic signature, provided that the composite amphiphilic nanoparticle includes at least one derivatized nanoparticle. The first and second nanoparticles are connected to each other directly, or through an intermediate linking group such as those containing an alkylene, aralkylene, arylene, ester, amide, urethane, urea, epoxy, ion-paired group, a combination thereof, or the like. Exemplary such linking groups include direct bonding of nano/microparticles by sigma bonds (e.g., 2+2 cycloadditions, 4+2 cycloadditions, etc.); reactive bonding via ester or amide linkages in which one nano/microparticle includes a carboxylic acid or reactive derivative (e.g., acid chloride, anhydride, etc.) and the other includes a hydroxy, amine, or epoxide group; stepwise bonding of different nano/microparticles using a bifunctional group such as an omega-halocarboxylic acid or derivative; or statistical linking of differently functionalized nano/microparticles via alpha-omega bifunctional compounds such as dihaloalkanes (e.g., diiodohexane), dihaloarenes (e.g., diiodobenzene) and the like, which can be coupled catalytically or by metalation/quenching.

In an embodiment, a downhole fluid comprises the amphiphilic nanoparticle. The amphiphilic nanoparticle, when combined with hydrocarbons such as those found in a spill, surrounds and forms an emulsion upon exposure to the hydrocarbon.

In another embodiment, the downhole fluid comprises an amphiphilic nanoparticle, and a fluid medium. The fluid medium is aqueous-based, non-aqueous, or is a mixture of aqueous and non-aqueous fluids. Where the non-aqueous fluids are included, these are water miscible, such as for example $C_{1-30}$ alcohols, $C_{2-30}$ glycols, poly(alkylene glycols), lactones such as gamma-butyrolactone, carbonates such as ethylene carbonate, dimethylsulfoxide, sulfolane, N-methylpyrrolidone, and the like; or the non-aqueous fluids are water-immiscible, such as oil, diesel, distillates, ethers, aromatics such as toluene, xylenes, ethylbenzene, and the like. In an embodiment, the fluid medium includes water, brine, an acid (such as hydrochloric acid) or a combination comprising at least one of the foregoing.

In an embodiment, the downhole fluid includes additives, such as acids, corrosion inhibitors, buffers, stabilizers, friction reducers, gellants, emulsifiers, non-emulsifiers, thickeners, shear-thinners, antioxidants, a water-miscible or non-miscible solvent, or a combination comprising at least one of the foregoing.

In an embodiment, an emulsion comprises a combination of the downhole fluid (containing the amphiphilic nanoparticle) and a hydrocarbon. The downhole fluid, containing the amphiphilic nanoparticle, can be used to control and dissipate oil spills, or to prevent oil spills. In an embodiment, a method of controlling an oil spill includes combining the downhole fluid with a spilled hydrocarbon. Also in an embodiment, a method of controlling an oil spill includes adding the downhole fluid to an oil well. The downhole fluid can be included downhole by injecting into a well. For example, the downhole fluid can be a stimulation fluid injected downhole during oil extraction, and injected downhole during this operation. The amphiphilic nanoparticle combines with hydrocarbon present in the oil well to form an emulsion.

While one or more embodiments have been shown and described, modifications and substitutions may be made thereto without departing from the spirit and scope of the invention. Accordingly, it is to be understood that the present invention has been described by way of illustrations and not limitation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A downhole fluid comprising:
   an amphiphilic nanoparticle, comprising
   a hydrophilic region comprising a hydrophilic functional group bonded to a first portion of a surface of the nanoparticle, and
   a hydrophobic region comprising a hydrophobic functional group bonded directly to a second portion of a surface of the nanoparticle by a carbon-carbon bond without intervening heteroatoms; and
   a fluid medium comprising brine and hydrochloric acid,
   wherein the second portion is not the same as the first portion; and
   wherein the degree of functionalization is from one functional group for each five carbon centers to one functional group for every 100 carbon centers.

2. The downhole fluid of claim 1, wherein the downhole fluid forms an emulsion upon exposure to a hydrocarbon.

3. The downhole fluid of claim 1, wherein the amphiphilic nanoparticle is graphene functionalized on an edge with a hydrophilic group.

4. The downhole fluid of claim 1, wherein the fluid medium further comprises a hydrocarbon.

5. The downhole fluid of claim 1, further comprising additives comprising acids, corrosion inhibitors, buffers, stabilizers, friction reducers, gellants, emulsifiers, non-emulsifiers, thickeners, shear-thinners, antioxidants, a water-miscible or non-miscible solvent, or a combination comprising at least one of the foregoing.

6. An emulsion comprising a combination of the downhole fluid of claim 1 and a hydrocarbon.

7. A method of controlling an oil spill comprising combining the downhole fluid of claim 1 with a spilled hydrocarbon.

8. A method of controlling an oil spill comprising:
   adding a downhole fluid comprising:
     an amphiphilic nanoparticle, comprising
     a hydrophilic region comprising a hydrophilic functional group bonded to a first portion of a surface of the nanoparticle, and
     a hydrophobic region comprising a hydrophobic functional group bonded directly to a second portion of a surface of the nanoparticle by a carbon-carbon bond without intervening heteroatoms,
     wherein the second portion is not the same as the first portion; and
     a fluid medium comprising brine and hydrochloric acid,
   to
   an oil well,
   wherein the degree of functionalization is from one functional group for each five carbon centers to one functional group for every 100 carbon centers.

9. The method of claim 8, wherein the amphiphilic nanoparticle combines with hydrocarbon present in the oil well to form an emulsion.

10. A downhole fluid comprising an amphiphilic nanoparticle comprising a first particle having a hydrophilic group, and a second different particle having a hydrophobic group, wherein one of the first and second particle is a nanoparticle and the other of the first and second particle is a microparticle, and a fluid medium comprising a hydrocarbon, brine, and hydrochloric acid.

11. The downhole fluid of claim 10, wherein the first particle and the second particle are connected to each other directly or through an intermediate linking group.

12. The downhole fluid of claim 11, wherein the intermediate linking group comprises an alkylene, aralkylene, arylene, ester, amide, urethane, urea, epoxy, ion-paired group, or a combination thereof.

13. The downhole fluid of claim 1, wherein the nanoparticle is graphene fiber comprising graphene particles having an average largest dimension of greater than 1 micron, a second dimension of less than 1 micron, and an aspect ratio of greater than 10, wherein the graphene particles form an interbonded chain.

14. The downhole fluid of claim 1, wherein the nanoparticle has a surface area of greater than 180 $m^2/g$.

15. The downhole fluid of claim 1, wherein the nanoparticle has an average smallest dimension of less than one micrometer.

16. The downhole fluid of claim 1, wherein the nanoparticle comprises a fullerene, a nanotube, nanographite, graphene, a nanodiamond, a polysilsesquioxane, a nanoclay, an inorganic nanoparticle, a metal nanoparticle or a combination comprising at least one of the foregoing.

17. The downhole fluid of claim 1, wherein the nanoparticle is graphene.

18. The downhole fluid of claim 17, wherein the graphene has an average particle size of greater than about 1 micrometer.

19. The downhole fluid of claim 1, wherein the graphene has an aspect ratio of greater than 10.

20. The downhole fluid of claim 1, wherein the hydrophilic functional group comprises hydroxy, carboxylic acid, amine, lactone, polyethylene glycol, a hydrophilic polymer, an ionic group, or a combination comprising at least one of the foregoing.

21. The downhole fluid of claim 1, wherein the hydrophobic functional group comprises alkyl, alkoxy, aryl, aryloxy, aralkyl, aralkyloxy, functionalized polymeric or oligomeric groups, or a combination of these groups.

* * * * *